United States Patent [19]
Gold

[11] Patent Number: 5,786,067
[45] Date of Patent: Jul. 28, 1998

[54] IN SITU AUTOMOTIVE GASKET AND METHOD OF MAKING SAME

[76] Inventor: Peter Gold, 465 N. Wood Rd., Rockville Centre, N.Y. 11570

[21] Appl. No.: 635,150

[22] Filed: Apr. 23, 1996

[51] Int. Cl.⁶ .......................... B32B 23/02; B32B 31/20
[52] U.S. Cl. .......................... 428/192; 428/172; 156/60; 156/196; 156/289; 156/308.4
[58] Field of Search .......................... 428/192, 31, 141, 428/172; 156/196, 60, 108, 308.4, 289, 292; 296/96.21, 146.15, 201; 49/463, 465, 483.1; 52/204.591

[56] References Cited

U.S. PATENT DOCUMENTS 5,057,354  10/1991  Kunert et al. .......................... 428/192

*Primary Examiner*—Donald Loney
*Attorney, Agent, or Firm*—Galgano & Burke

[57] ABSTRACT

A method of manufacturing and installing an automotive gasket includes providing a peripheral bead of urethane on the interior surface of a window glass or other hinged vehicle part, applying uncured silicone adhesive to a channel flange of the vehicle body frame, closing the hinged vehicle part so that the urethane bead displaces a portion of the silicone adhesive, and curing the adhesive in its displaced condition. Due to the non-adhesive property of the urethane relative to the silicone, the urethane bead does not stick to the silicone, but provides a mating seal with the cured silicone when the hinged vehicle part is closed. The urethane bead can be automatically applied to the window glass or other hinged vehicle part during manufacture of the glass or part. Similarly, the silicone adhesive can be applied to vehicle flanges by machine on the assembly line and the gasket can be cured in situ.

13 Claims, 2 Drawing Sheets

IN SITU AUTOMOTIVE GASKET AND METHOD OF MAKING SAME

BACKGROUND OF THE INVENTION

1. Field of the Invention

The invention relates to automotive gaskets. More particularly, the invention relates to a gasket for a hinged automotive window or other hinged automotive body part such as the trunk lid or engine compartment hood.

2. State of the Art

My prior U.S. Pat. Nos. 5,413,397 and 5,478,132 (the subject matter of which is incorporated herein by reference thereto) relate to window gaskets for stationary automotive windows such as rear windows and windshields. The gaskets disclosed in these patents form a permanent seal between the window glass and the body of the automobile.

In certain vehicles, such as passenger vans and sport utility vehicles, hinged windows are provided on the sides and/or the rear of the vehicle. In order to provide a weather seal between the vehicle body and the hinged window glass, a gasket is attached to the vehicle body. More particularly, the window frame of the vehicle body is typically provided with an L-shaped or channel flange and an extruded rubber gasket is attached to the flange with an adhesive. Prior art FIG. 1 shows such an arrangement where a frameless window glass 10 is coupled by hinges 12 to a vehicle body 14 and a rubber gasket 16 attached to a flange 18 makes a weather seal between vehicle body 14 and the window glass 10 when the window is closed. Similar arrangements of rubber gaskets on flanges are also used to provide weather seals for trunk lids, engine compartment hoods, and doors.

The rubber gaskets used for these purposes are typically manufactured by a sub-contractor and are manually attached to the vehicle on the assembly line. While many aspects of vehicle manufacture have been automated, the manual installation of sub-manufactured automotive parts remains a costly part of the manufacturing process. In addition, due to normal variations in manufacturing tolerances, the state of the art gaskets do not always provide the best weather seal.

SUMMARY OF THE INVENTION

It is therefore an object of the invention to provide a system for manufacturing and installing an automotive gasket on the assembly line.

It is also an object of the invention to provide a system wherein the installation of an automotive gasket is substantially automated.

It is another object of the invention to provide a system for manufacturing and installing an automotive gasket which compensates for variations in manufacturing tolerances.

It is still another object of the invention to provide a system for manufacturing and installing an automotive gasket which minimizes the costs of sub-manufacturing.

In accord with these objects which will be discussed in detail below, the system of manufacturing and installing an automotive gasket of the present invention includes providing a peripheral bead of a curable first material (preferably, urethane) on the interior surface of a window glass or other hinged vehicle part, applying a curable second material which is non-adherable to the first material (preferably uncured silicone adhesive) to a channel flange of the vehicle body frame, closing the hinged vehicle part so that the urethane bead displaces a portion of the silicone adhesive, and curing the adhesive in its displaced condition. Due to the non-adhesive property of the urethane relative to the silicone, the urethane bead does not stick to the silicone, but provides a mating seal with the cured silicone when the hinged vehicle part is closed. The urethane bead can be automatically applied to the window glass or other hinged vehicle part during manufacture of the glass or part. Similarly, the silicone adhesive can be applied to vehicle flanges by machine on the assembly line and the gasket can be cured in situ.

While the gasket according to the invention is particularly well suited for hinged windows, it can also be used with any hinged vehicle part to form an economical custom-fit weather seal. Additional objects and advantages of the invention will become apparent to those skilled in the art upon reference to the detailed description taken in conjunction with the provided figures.

DETAILED DESCRIPTION OF THE PREFERRED EMBODIMENTS

Figure 3:
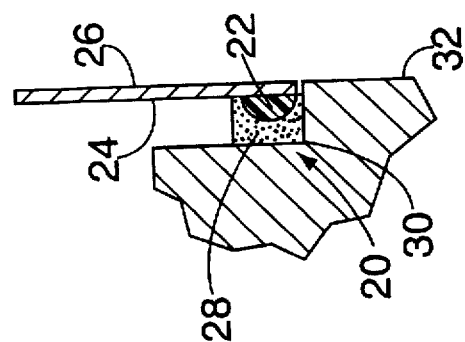
FIG. 3 is a broken sectional view of the first embodiment of the invention subsequent to curing with the window in the closed position.
Figure 2:
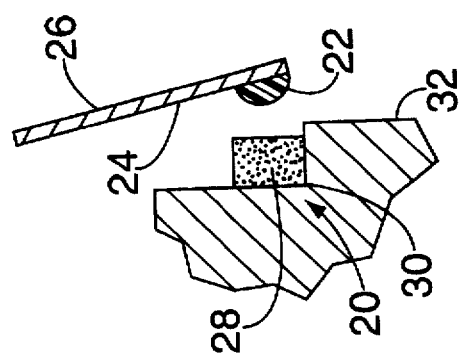
FIG. 2 is a broken sectional view of window gasket according to a first embodiment of the invention prior to curing.
Figure 1:
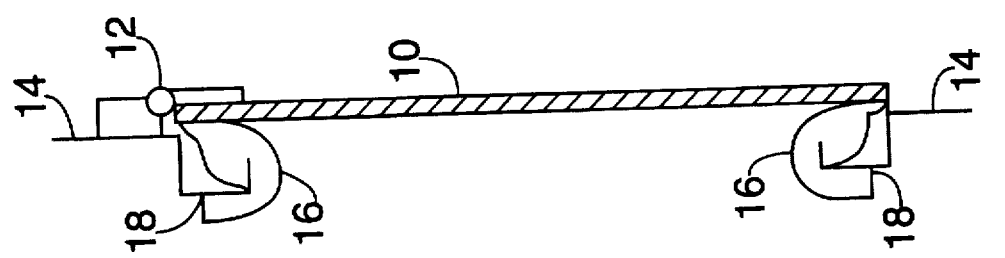
FIG. 1 is a sectional view of a prior art hinged vehicle window with an extruded rubber sealing gasket.
Figure 4:
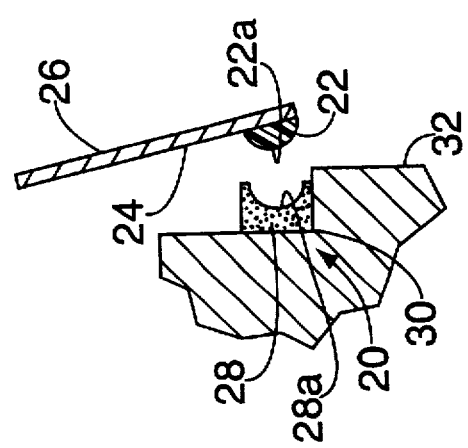
FIG. 4 is a view similar to FIG. 3 with the window in the opened position.

Referring now to FIGS. 2 through 4, a first embodiment of a gasket system 20 according to the invention includes a peripheral bead of urethane 22 on the interior surface 24 of a hinged window glass 26 or other hinged vehicle part, and a silicone adhesive 28 in a channel flange 30 of the vehicle body frame 32. According to this first embodiment of the invention, the urethane bead 22 assumes a substantially semi-cylindrical convex section, and the silicone adhesive 28 assumes a substantially semi-cylindrical mating concave section.

According to a method of the invention, the peripheral bead of urethane 22 is applied to the interior surface 24 of the window glass 26 prior to applying the silicone adhesive 28 to the channel flange 30. The window glass 26 is attached to the vehicle body 32 via hinges not shown and is held in the opened position. Uncured silicone adhesive 28 is then applied to the channel flange 30 and the window glass 26 is moved to the closed position as shown in FIG. 3. In this position, the uncured silicone adhesive 28 is displaced by the urethane bead 22 such that the adhesive 28 conforms to and embraces the profile of the bead 22. With the window glass 26 in this position, the silicone adhesive 28 is cured to form a window gasket in situ. Due to the non-adhesive property of the urethane 22 relative to the silicone 28, the urethane bead 22 does not stick to the silicone 28. After the silicone 28 is cured, the window glass 26 is moved to the opened position as shown in FIG. 4. The cured silicone 28 is adhered to the channel 30 and presents a concave outer surface 28a which conforms to the convex outer surface 22a of the urethane bead 22.

Those skilled in the art will appreciate that the mating relationship of the cured silicone 28 and the urethane bead 22 is a custom-fit which accounts for any tolerance variations in the window frame of the vehicle and the window glass. When the window glass 26 is moved again to the closed position, the concave surface 28a of the cured silicone embraces the convex surface 22a of the urethane to provide a tight weather seal. It will also be understood that the urethane bead 22 can be automatically applied to the window glass 26 (or other hinged vehicle part) during manufacture of the glass 26 (or part). Similarly, the silicone adhesive 28 can be applied to vehicle flanges by machine on the assembly line.

Figure 6:
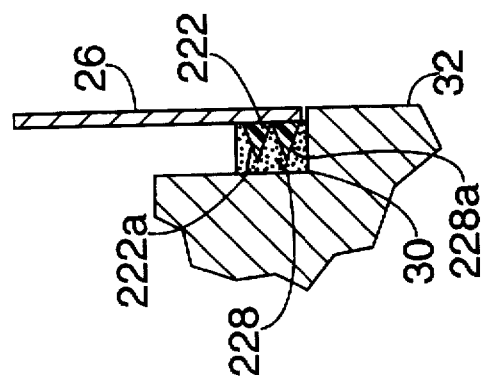
FIG. 6 is a view similar to FIG. 5 of a third embodiment of the invention.
Figure 5:
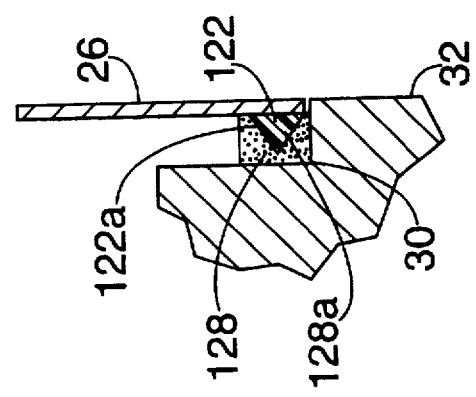
FIG. 5 is a view similar to FIG. 4 of a second embodiment of the invention.

It will also be appreciated that other non-compatible (i.e. non adhering materials could possibly be used in place of urethane and silicone. In addition, the mating surfaces of the silicone adhesive and the urethane bead may assume various configurations. As shown and described above with reference to FIG. 2–4, the bead 22 is substantially semi-cylindrical and presents a convex surface to the silicone 28. However, as shown in FIG. 5, a semi-cylindrical surface is not necessary to the invention. The bead 122 in FIG. 5 has a V-shaped convex surface 122a which forms a V-shaped concave surface 128a in the silicone 128 after curing. Moreover, the bead 222 shown in FIG. 6 has a W-shaped partially concave and partially convex surface 222a which forms a mating W-shaped partially concave and partially convex surface 228a in the silicone 228. It will therefore be understood that many different kinds of mating surfaces can be created utilizing the methods of the invention.

There have been described and illustrated herein several embodiments of an automotive gasket and methods of making the same. While particular embodiments of the invention have been described, it is not intended that the invention be limited thereto, as it is intended that the invention be as broad in scope as the art will allow and that the specification be read likewise. Thus, while window gaskets have been disclosed, it will be appreciated that gaskets of the invention could be utilized with other hinged automotive parts. Also, while substantially U-shaped channel flanges have been shown, it will be recognized that other types of flanges could be used with similar results obtained. Moreover, while particular configurations have been disclosed in reference to the mating surfaces, it will be appreciated that other configurations could be used as well. Furthermore, while the invention has been described as particularly useful in connection with hinged parts, the gaskets of the invention could be used with stationary windows or in other situations in which a custom-fit gasket is desirable. It will therefore be appreciated by those skilled in the art that yet other modifications could be made to the provided invention without deviating from its spirit and scope as so claimed.

What is claimed:

1. A method of making an in situ automotive gasket for use with an automotive part which is hingedly attached to a portion of an automotive body having a flange defining an opening to be closed by the automotive part, said method comprising the steps of:

a) applying a peripheral curable bead to an interior surface of the automotive part;

b) curing said bead;

c) applying a curable adhesive material to the flange of the automotive body, said material being non-adherable to said bead;

d) closing the hingedly attached automotive part so that said bead displaces a portion of said material; and e) curing said material, thereby forming an in situ automotive gasket.

2. A method according to claim 1, wherein:

said bead is urethane and said material is silicone adhesive.

3. A method according to claim 2, wherein:

said bead of urethane is provided with a convex outer surface.

4. A method according to claim 2, wherein:

said bead of urethane is provided with a concave outer surface.

5. A two-piece gasket for providing a releasable seal between a first member which is hingedly attached to a second member, said gasket comprising:

a) a peripheral curable bead applied to one of the first and second members;

b) a curable adhesive material, non-adherable to said bead, applied to the other of the first and second members, said material being applied in an uncured condition such that said material is partially displaced when the first member is hingedly closed to the second member and said material being cured in said partially displaced condition to thereby form a gasket in situ.

6. A gasket according to claim 5, wherein:

said bead is urethane and said material is silicone adhesive.

7. A gasket according to claim 6, wherein:

said bead has a convex outer surface.

8. A gasket according to claim 6, wherein:

said bead has a concave outer surface.

9. A method of making a gasket, in situ, for weather sealing a first member and a second member, said method comprising:

a) applying a curable bead to one of the first and second members;

b) curing said bead;

c) applying a curable adhesive material to the other of the first and second members, said material being non-adherable to said bead;

d) mating the first and second members so that said bead partially displaces said material; and e) curing said material after it is partially displaced.

10. A method according to claim 9, wherein:

said bead is urethane and said material is silicone adhesive.

11. A method according to claim 10, wherein:

the first member is glass and said bead of urethane is applied to the first member.

12. A method according to claim 10, wherein:

said bead of urethane is provided with a convex outer surface.

13. A method according to claim 10, wherein:

said bead of urethane is provided with a concave outer surface.

* * * * *